Oct. 25, 1927.
V. KARAPETOFF
1,646,821
REGULATING SYSTEM FOR DYNAMO ELECTRIC MACHINES
Filed Aug. 11, 1925
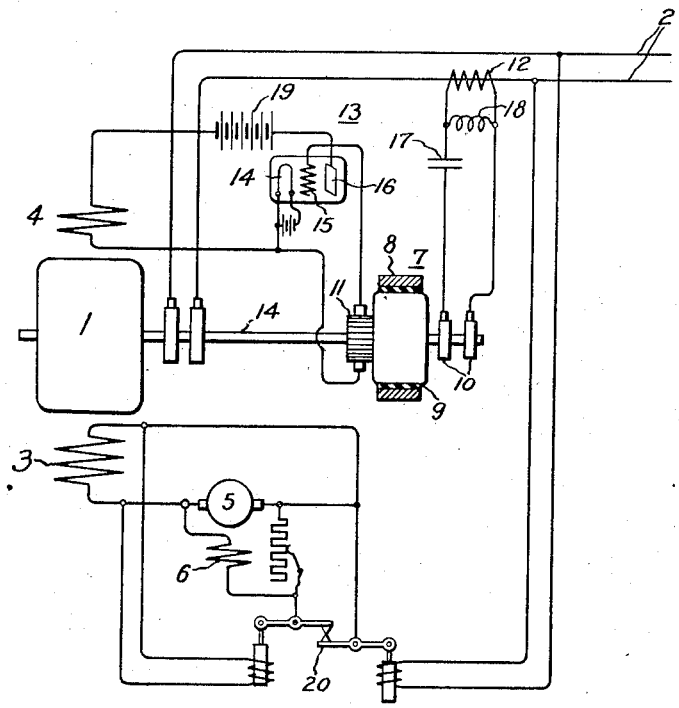
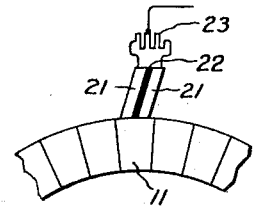
Inventor:
Vladimir Karapetoff,
by
His Attorney Patented Oct. 25, 1927.

1,646,821

UNITED STATES PATENT OFFICE.

VLADIMIR KARAPETOFF, OF ITHACA, NEW YORK, ASSIGNOR TO GENERAL ELECTRIC COMPANY, A CORPORATION OF NEW YORK.

REGULATING SYSTEM FOR DYNAMO-ELECTRIC MACHINES.

Application filed August 11, 1925. Serial No. 49,599.

My invention relates to the excitation of alternating current machines, and more particularly to voltage regulating means for synchronous alternating current machines used in connection with high-voltage long-distance power transmission systems.

The voltage stability of the synchronous machines of a transmission system becomes a predominating factor in connection with the problem of transmitting electrical energy over long distances. In a long transmission line, the critical load for stable operation may be reached before the economic load is attained. That is, when transmitting the load desired, it may be necessary to have generating apparatus operated with little or no voltage change, at least, to have the voltage restored quickly to its normal value, or even increased, on sudden changes of load. Otherwise, the synchronizing force between the synchronous machines of a system may be greatly weakened, so that the machines become unstable and fall out of synchronism with the system.

When a short circuit or sudden relatively large increment of load is thrown on a line, the alternator field current is momentarily increased corresponding to the increase in armature current and then dies off as a transient because there is no voltage to sustain it. An alternator controlled by even a sensitive type of voltage regulator, such for example as a Tirrill or vibratory type of regulator, behaves for sudden changes of load much the same as if it were operating at a constant field current. The terminal voltage must first change, causing a change in the setting of the contacts, before a corresponding change in the exciting current takes place. It is this time lag in the operation of the regulator that imposes a serious limitation upon the output of long-distance power transmission lines.

An object of my invention is to provide novel regulating means whereby the voltage of an alternating current machine may be maintained substantially constant irrespective of sudden variations in the magnitude and power factor of the load current.

A further object of my invention is the provision of an improved arrangement for stabilizing the operation of synchronous machines interconnected with high-voltage long-distance transmission lines, whereby the line may be operated closer to its maximum power limit.

In accordance with my invention, improved means are provided for maintaining the voltage of synchronous dynamo-electric machines during line current transients caused by sudden application of load or short circuit. Preferably, I accomplish these results by providing quickly responsive means to control the energization of an auxiliary winding on the field poles of a synchronous machine. This control means preferably comprises a special type of rotary converter mechanically coupled or rotated in electrical phase synchronism with the synchronous machine and electrically connected with the transmission lines to provide increased excitation substantially simultaneously with the change in magnitude and power factor of the line current.

The novel features which I believe to be characteristic of my invention are set forth with particularity in the appended claims. The invention itself, however, both as to organization and method of operation, together with further objects and advantages thereof, will best be understood by reference to the following description taken in connection with the accompanying drawing, in which Fig. 1 is a diagrammatic representation of the generator end of a single-phase transmission system wherein my invention has been embodied, and Fig. 2 is an enlarged view of a brush for the rotary converter.

Referring to the drawing, 1 denotes a single phase alternating current generator providing the energy to be transmitted over the transmission line 2. The generator is provided with a main field winding 3 and an auxiliary field winding 4 so positioned as to allow considerable magnetic leakage between the two windings. The winding 4 may be coaxial with the winding 3, or displaced by an angle with respect thereto, depending upon the compensation desired, that is, predominantly for the direct or transverse armature reaction. The field winding 3 of generator 1 is energized by means of a direct current shunt-wound exciter 5 provided with a field winding 6. The energization by the exciter 5 may be controlled by means of a Tirrill type voltage regulator 20 or any other similarly sensitive type of regulator operating to change periodically the excitation of the field winding 6 in response to the line voltage. The auxiliary field winding 4 is energized by means comprising a special type of dynamo-electric machine 7 comprising an armature, such as is used in a rotary converter, surrounded by a stator core, with or without polar projection but without a winding, which serves to close the magnetic circuit of the armature reaction. In the drawing, the stator is shown as an iron ring 8 shrunk over the armature with a thin layer of insulating material 9 interposed between the iron ring and the armature to provide an air gap. The armature is provided with slip rings 10 and a commutator 11. The slip rings 10 are connected to the main alternating current circuit through a current transformer 12, while the commutator 11 is connected to a suitable amplifier, such as a thermionic device 13 having its output terminals connected to the auxiliary winding 4. The main exciter may be driven by any convenient means, while the auxiliary dynamo-electric machine 7, which is incapable of producing any torque, may be directly coupled on the alternator shaft 14. Any other convenient coupling may be used so long as the rotary converter is connected to the alternator in such a manner that electrical phase synchronism may be maintained between the two machines.

Since the brushes of the rotary converter at times may be in a strong magnetic field, there may be a tendency toward serious sparking at the brushes. Hence, the auxiliary field current will not be taken directly from the converter, but will be controlled by a space current device, such as a three-electrode thermionic tube 13. With small currents, narrow hard brushes can be used, or as shown in Fig. 2, each brush may consist of two parts 21 with insulation 22 interposed between the parts and a protective resistance 23 connecting the same.

The thermionic tube 13 comprises a cathode 14, a control electrode or grid 15, and an anode or plate 16. The brushes of the rotary converter are connected to the input terminals of the thermionic device, while the output terminals of the thermionic device are connected through an exciter or battery 19 to the auxiliary winding 4. As is well known in the art, the intensity of the current flow between the cathode and the anode depends primarily upon the voltage applied between the anode and cathode, upon the temperature of the cathode, and upon the potential of the grid with respect to the cathode. The more positive the grid within certain limits, the greater will be the current flowing between the cathode and anode.

Since the output terminals of the thermionic tube 13 are connected to the field winding 4, the field winding current will depend upon the potential of the grid 15 which responds to the voltage of the rotary converter under changing load conditions. The connections from the rotary converter to the input terminals of the thermionic device may be arranged so that under any desired load condition, the grid 15 will be slightly negative or at such a potential with respect to the cathode 14 that little or no current is supplied to the auxiliary winding 4. As soon as there is a sudden increase in load, the voltage of the converter will increase and make the grid more positive with respect to the cathode, thereby increasing the space current and consequently the field flux of the auxiliary winding 4.

In order to make the rotary converter operate mainly on a sudden increase in load, a condenser 17 is connected in series relation with the circuit to the slip rings and an inductance 18 is connected across the transformer 12. A sudden increase of voltage accompanying a current transient will, therefore, raise the potential across the slip rings 10 of the rotary converter.

The operation of the regulating system consists, broadly stated, in partially balancing the effect of armature reaction in an alternator by supplementing the field flux in order to maintain the generator voltage under sudden applications of load, by supplying an additional field varying substantially instantaneously with a change in magnitude and power factor of the line current. When the armature of the auxiliary dynamo-electric machine is rotated with the alternator, the alternating current from the polyphase alternator mains will produce a magnetic field stationary in space and substantially proportional to the magnitude of the line current. The position of this field with respect to the direct current brushes is determined by the power factor of the line current. Thus, the brushes may be so set that the reactive current would induce a high direct current voltage, while the in-phase current would have a smaller effect, or vice-versa, or in any desired proportion, as well as compounding.

Assume that the alternator is in operation under normal load conditions and that the excitation for the alternator is provided by the shunt exciter 5 energizing the main field winding 3. Now if the alternator is subjected to a short circuit or a suddenly increased load, the increased excitation to maintain the voltage of the synchronous machine will be controlled by the auxiliary dynamo-electric machine 7 which responds substantially instantaneously to the change in load current. The operation of the regulator 20 energized in accordance with a condition of line voltage will be effective, after a certain interval, to maintain the voltage of the alternator constant under steady-state conditions by short circuiting or inserting a portion of the resistance in the field circuit 6 of the exciter 5 in a manner well known.

By placing the brushes of the rotary converter in the proper position, it is possible to increase the auxiliary excitation with any increase in lag of the main current, or to decrease the auxiliary excitation with any increase in lead of the main current. The alternator is thus automatically regulated not only for changing load, but also for changes of lag or lead in the main current.

The shunt exciter with the regulator is therefore instrumental in regulating the excitation for steady-state conditions, and in the interval during which transient phenomena occur, the sensitive, quick-acting dynamo-electric machine 7 controls the energization of the auxiliary field winding to complement the excitation of the main source and thus maintain the voltage of the alternator. The alternator excitation thus comprises two components, one of which is supplied from the exciter 5 under steady-state conditions, and the other, a complementary excitation which is controlled through the auxiliary dynamo-electric machine 7 under transient conditions varying substantially simultaneously with changes in magnitude and power factor of the line current.

While I have shown and described a particular embodiment of my invention, it will be obvious to those skilled in the art that changes and modifications may be made within the scope of my invention, and I, therefore, aim in the appended claims to cover all such changes and modifications that fall within the true spirit and scope of my invention.

What I claim as new and desire to secure by Letters Patent of the United States, is:—

1. The combination with an electric power circuit, of a synchronous dynamo-electric machine connected to said power circuit, an excitation circuit therefor, a main source of electrical energy for said excitation circuit, a regulator responsive to an electrical condition of said power circuit for controlling said excitation circuit, and auxiliary excitation means controlled in accordance with line current transients for complementing the excitation of said main source in accordance with variations in magnitude and power factor of the line current and substantially simultaneously therewith.

2. The combination with an electric power transmission system, of a synchronous dynamo-electric machine for supplying power thereto, an excitation circuit therefor, a main source of electrical energy for said excitation circuit, a regulator responsive to the voltage of said synchronous machine for controlling said excitation circuit, and a dynamo-electric rectifying means connected to respond to line current transients for controlling the excitation of said synchronous dynamo-electric machine in accordance with the variations in magnitude and power factor of the line current and substantially simultaneously therewith.

3. In a regulating system, the combination with a synchronous dynamo-electric machine having an excitation circuit, of an electric power circuit connected to said synchronous machine, a rotary converter electrically connected with said power circuit to respond to current variations therein, means connecting said rotary converter in electrical phase synchronism with said synchronous machine, and a thermionic amplifier responsive to the voltage of said rotary converter connected to said excitation circuit to control the energization thereof.

4. In a voltage regulating system, the combination with a synchronous dynamo-electric machine having a field circuit, of a transmission line connected to said synchronous machine, a rotary converter having an unwound field structure electrically connected with said transmission line to respond to the variations in magnitude and power factor of the current therein, means for connecting said rotary converter in electrical phase synchronism with said synchronous machine, a thermionic device provided with an anode and a cathode connected with said field circuit, and a control electrode for said thermionic device connected to said rotary converter for controlling the space current of said thermionic device to control the energization of said field circuit.

5. The combination of a synchronous machine comprising main and auxiliary field circuits and an armature circuit, a transmission line connected to said armature circuit, an exciter for energizing said main field circuit, means for controlling the excitation of said exciter in accordance with variations in line voltage, and means comprising a dynamo-electric rectifying device connected to said line and arranged to be effective mainly during line current transients for controlling the energization of said auxiliary field circuit in accordance with variations in magnitude and power factor of said line current and substantially simultaneously therewith.

6. The combination of a synchronous machine comprising main and auxiliary field circuits and an armature circuit, a transmission line connected to said armature circuit and an exciter for energizing said main field circuit, means for controlling the excitation of said exciter in accordance with variations in line voltage, a dynamo-electric rectifying means connected to said line arranged to be effective mainly during line current transients, a space current device interposed between said rectifying means and said auxiliary field circuit, a source of electric energy in said auxiliary field circuit, and a control electrode for said space current device connected to said rectifying means and arranged to vary the excitation in said auxiliary field circuit in accordance with the variations in magnitude and power factor of said line current and substantially simultaneously therewith.

7. The combination of a synchronous machine comprising main and auxiliary field circuits and an armature circuit, a transmission line connected to said armature circuit, an exciter for energizing said main field circuit, means for controlling the excitation of said exciter in accordance with variations of line voltage, a source of electric energy in said auxiliary field circuit, a thermionic device comprising an anode, a cathode and a control electrode having its output terminals connected to said auxiliary field circuit, and a rotary converter excited solely by its own armature reaction arranged to be effective mainly on line current transients connected to said control electrode and said cathode to vary the excitation in said auxiliary field circuit in accordance with variations in the magnitude and power factor of said line current and substantially simultaneously therewith.

8. The combination of a synchronous machine comprising main and auxiliary field circuits and an armature circuit, a transmission line connected with said armature circuit, an exciter for energizing said main field circuit, means for controlling said exciter in accordance with variations in line voltage, a source of electric energy in said auxiliary field circuit, a thermionic device comprising an anode and a cathode connected with said auxiliary field winding, a rotary converter excited solely by its armature reaction rotated in electrical phase synchronism with said synchronous machine, a current transformer connected with said rotary converter and associated with said line, a reactor connected across the alternating-current terminals of said rotary converter, a condenser in series with the alternating-current terminals of said rotary converter, and a control electrode for said thermionic device connected with said rotary converter for controlling the space current of said thermionic device such that the auxiliary excitation varies directly with the magnitude and increase in lag and inversely as the increase in lead of the line current and at substantially the same time.

In witness whereof, I have hereunto set my hand this 8th day of August, 1925.

VLADIMIR KARAPETOFF.